United States Patent [19]

Barba et al.

[11] Patent Number: 4,823,063
[45] Date of Patent: Apr. 18, 1989

[54] AUTHORITY LIMITER

[75] Inventors: Valentin G. Barba, Princeton Junction, N.J.; Eugene E. Shube, Elmont, N.Y.

[73] Assignee: Plessey Incorporated, White Plains, N.Y.

[21] Appl. No.: 39,099

[22] Filed: Apr. 16, 1987

Related U.S. Application Data

[63] Continuation-in-part of Ser. No. 719,150, Apr. 2, 1985, Pat. No. 4,683,407.

[51] Int. Cl.⁴ .................... G05B 17/00; B64C 3/18
[52] U.S. Cl. ......................... 318/689; 318/434
[58] Field of Search ............ 318/689, 676, 626, 640, 318/434, 466, 467, 668, 582, 584, 585, 586, 159, 160, 563, 565; 244/76 A, 175, 177, 178, 180, 181, 194, 195

[56] References Cited

U.S. PATENT DOCUMENTS

| | | | |
|---|---|---|---|
| 2,871,436 | 1/1959 | Kafferty | 318/565 X |
| 3,405,337 | 10/1968 | Papik | 318/565 X |
| 4,063,140 | 12/1977 | Kammerer | 318/565 X |
| 4,255,694 | 3/1981 | Mozris et al. | 318/565a |
| 4,281,811 | 8/1981 | Nixon | 318/565 X |
| 4,376,262 | 3/1983 | Okuda et al. | 318/685 X |
| 4,464,661 | 8/1984 | Redmond | 318/565 X |
| 4,599,698 | 7/1986 | Fischer et al. | 318/565 X |
| 4,605,886 | 8/1986 | Inoue | 318/565 |
| 4,638,229 | 1/1987 | Birkedahl | 318/565 X |
| 4,677,355 | 6/1987 | Baumann | 318/160 |
| 4,683,407 | 7/1987 | Baiba et al. | 318/640 X |

FOREIGN PATENT DOCUMENTS 2655927 12/1976 Fed. Rep. of Germany ...... 318/160

OTHER PUBLICATIONS

"Hall Effect IC Operations" a pamphlet published by Sprague Electric Company, Concord, N.H., 1985.

*Primary Examiner*—Bentsu Ro
*Attorney, Agent, or Firm*—Fleit, Jacobson, Cohn & Price

[57] ABSTRACT

An authority limiter includes an input shaft clutched to an output shaft. The output shaft is geared to a motor. Opto-sensors, variable resistors or Hall effect devices provide control signals to a current source supplying power to the motor. Different amounts of opposing torque are applied by the motor dependent upon the positioning of a disc, mechanically attached to the output shaft, that is sensed by the detecting devices. By sensing various angular deviations from a null position, scheduled degrees of torque are applied to the input and output shafts. In another embodiment, the disc is coupled to the output shaft by an auxiliary clutch. When the electrical power is removed from both clutches and the motor, a rotational centering means moves the disc back to a null position with respect to the limiter. Fault monitoring circuitry is provided to disengage the authority limiter when a fault occurs. Finally, solid state switches are provided for interfacing with the aircraft and for enablement of associated devices or satisfactory engagement of the clutch.

13 Claims, 12 Drawing Sheets

AUTHORITY LIMITER

This is a continuation-in-part of U.S. patent application Ser. No. 719,150, filed Apr. 2, 1985, assigned to the same assignee as the present invention.

The present invention relates to an authority limiter, e.g., a mechanism which provides a desirable opposing force or torque schedule to a shaft by electrical means. When installed in airplanes, this mechanism provides an electrically clutched additional torque schedule to the lateral or roll control system of the airplane to limit the power control unit's output when operated through the autopilot transfer device.

SUMMARY

When the autopilot is activated, a torque motor, geared to an output shaft, is clutched to an input shaft. The input shaft regulates the control surfaces of the airplane. The torque motor provides opposing, scheduled degrees of torque to the input shaft when the shaft exceeds one or more degrees of angular deviation from a null position.

In one embodiment, a disc is affixed to the output shaft. The disc is made of a ferromagnetic material and has cut-outs therein defining permissible degrees of angular deviation from a null position. Hall effect devices are disposed transversely with respect to the cut-outs and provide electrical signals indicative of when the disc, and also the joined or clutched together input and output shafts, exceeds the permissible degrees of angular deviation.

Another embodiment utilizes a second clutch mechanism between the disc and the output shaft. This embodiment is useful if a requirement is imposed on the authority limiter to return to the null position within a very short period of time, for example, one second. The null position is initially set with respect to an angular deviation of the input shaft at the time the main clutch is activated. If the main clutch is then deactivated with this further embodiment, the positioning disc immediately returns back to a null set within the authority limiter due to the simultaneous deactivation of the second clutch with the main clutch and due to a rotational biasing or centering means (a spring). This feature allows the operator to immediately reengage the authority limiter without the necessity of requiring the torque motor to rotate the output shaft back to the null position.

In conjunction with the alternative embodiments, a "Health Monitoring" or fault monitoring system is provided. This system compares parallel command and feedback channels at various points in the circuitry and provides for non enablement of the clutch coil if certain faults exist at the time engagement is selected, or for de-energizing of the clutch coil if certain faults develop after engagement.

Solid state switches are provided which signal confirmation of a selected mode.

Solid state switches are provided which enable one or more (two are illustrated) loads upon successful engagement of the clutch. In practical application this permits autopilot activation only if the authority limiter clutch has actually engaged, and de-activates the autopilot(s) if the clutch has disengaged, either on detection of fault by the internal "Health Monitoring" sub system, or by deliberate disengagement.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

BRIEF DESCRIPTION OF DRAWINGS

For a fuller understanding of the nature and objects of the invention, the following detailed description is provided which is taken in connection with the accompanying drawings, in which.

DETAILED DESCRIPTION OF THE INVENTION

Referring to drawings, in which like numerals identify similar parts throughout, FIGS. 1 to 7, inclusive, illustrate an embodiment of the torque schedule mechanism for autopilot lateral control.

The mechanism consists basically of a geared torque motor, the relating electronics and an electromagnetic clutch. The input shaft 1, which is normally free to rotate in either direction, becomes coupled to the motor gear output shaft 2 at the instant the power is applied to the clutch terminals, i.e., when the autopilot is activated. When in the engaged position, the torque required to rotate the input shaft in either direction follows the envelope determined by a position disc 12 attached to the motor gear output shaft 2 in accordance with the related electronics as described later with respect to an embodiment of the present invention. At the moment the clutch is disengaged, the motor gear output shaft 2 returns automatically to its initial position.

FIGS. 1 to 7 inclusive, illustrate an embodiment of the mechanism object of the present invention in which two levels of resistance torque $T_1$ and $T_2$, i.e., two degrees of scheduled torque, for each direction of output shaft rotation are provided. As can be seen from FIG. 1, the input shaft 1 becomes coupled to the motor gear output shaft 2 at the instant the power is applied to the electromagnetic clutch 3. Attached to the shaft 2 are the clutch armature 4 and the spur gear 5. This spur gear 5, together with spur gear 6 and rotor pinion 7 form a two stage gear coupled to the torque motor 8.

Figure 3:
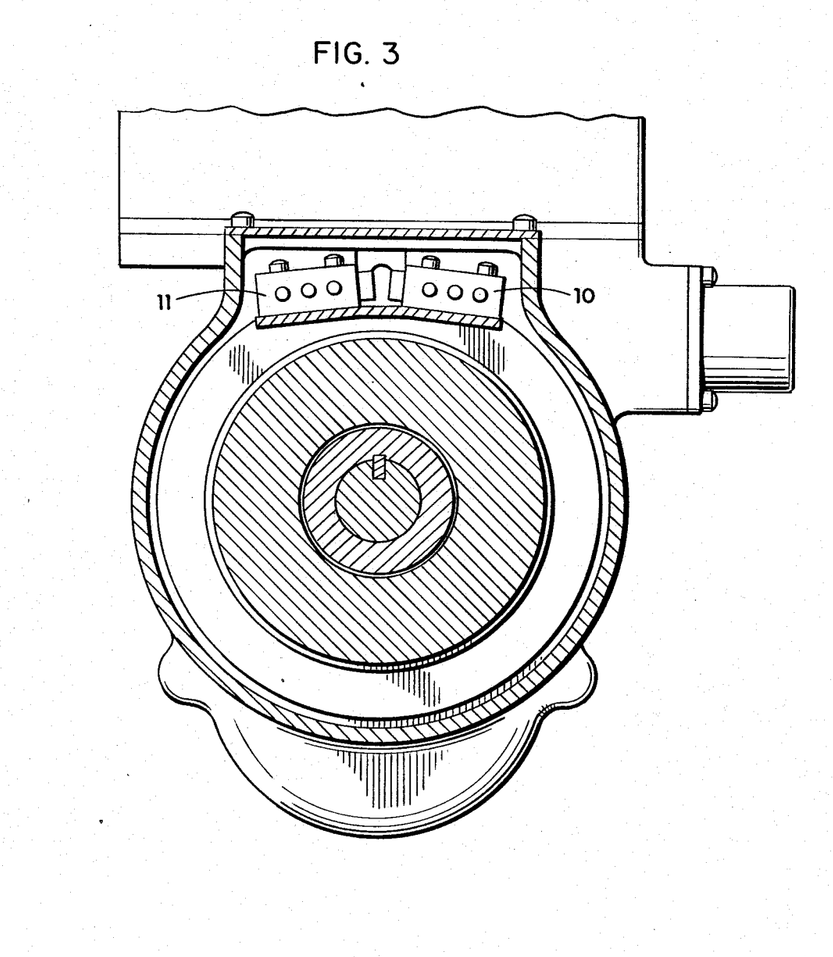
FIG. 3 is a transverse section taken substantially on line A—A of FIG. 1.
Figure 4:
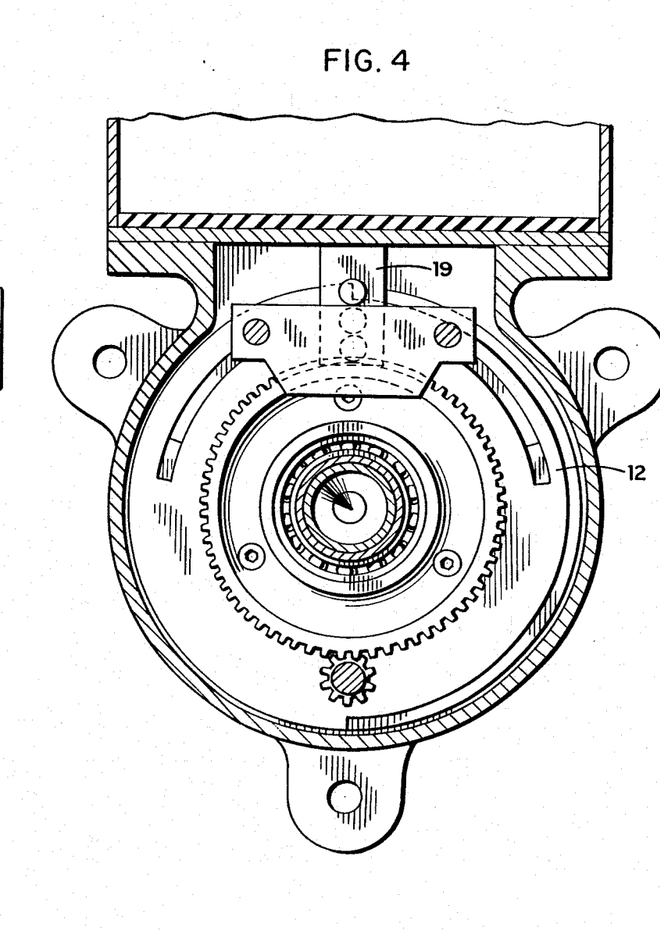
FIG. 4 is a partial section taken on line B—B of FIG. 1.

Attached to the clutch armature 4 is a disc 9, which activates switches 10, 11 (switch 11 is shown in FIG. 3) signalling the clutch status, and an obtruding disc 12 which activates three opto coupler sensors including LED-sensor pairs 13-14, 15-16 and 17-18 which in turn are mounted in a support bracket 19, to the main housing 20. The related electronics is packaged in an electrical assembly 21 and an electric connector 22 is used for the external power supply and for the control signals.

Figure 5:
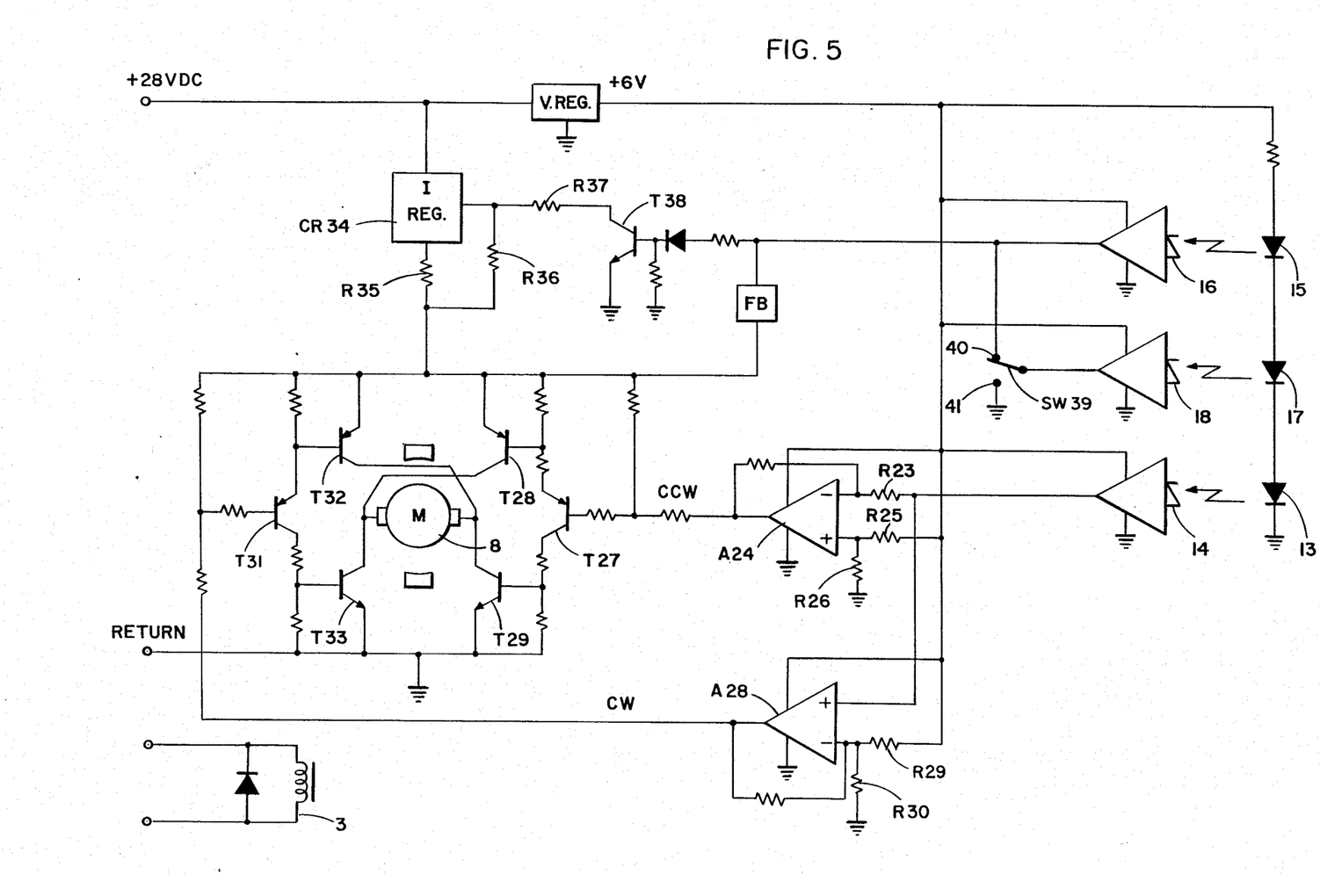
FIG. 5 is the schematic circuit of the mechanism shown in FIG. 1.
Figure 6A:
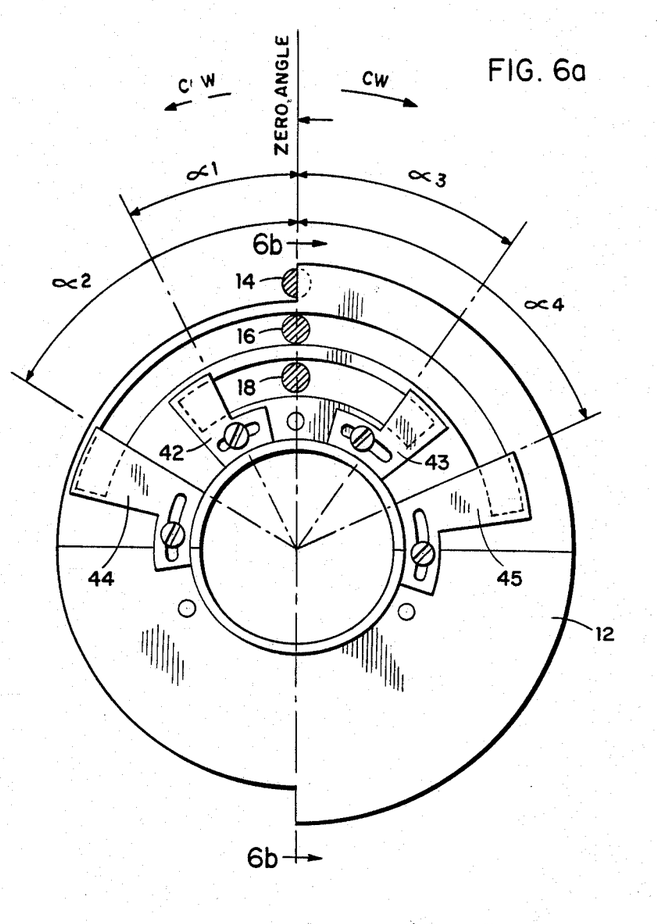
FIG. 6a details the positioning disc and optical sensor locations.
Figure 6B:
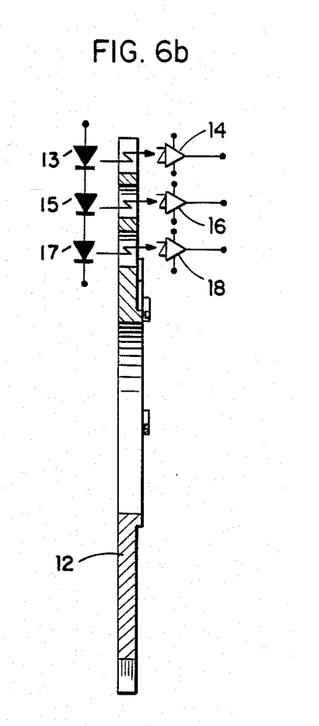
FIG. 6b shows a cross-sectional view of the positioning disc and optical sensors at the zero position.

To describe the mode of operation of the mechanism consider first that the obtruding disc 12 is in a zero position as it is shown in FIGS. 6a and 6b, and the clutch 3 is engaged. In this position half of the sensor 14 active area is illuminated by the light emitting diode 13 (due to the etched outer radial slot on disc 12) and therefore the output voltage of this sensor will be half of its maximum value, which occurs when all its active area is illuminated. This is the null position. As shown in the schematic of FIG. 5, the output voltage of sensor 14 is applied through a resistance R23 to the inverting input terminal of an operational amplifier A24. Through the divider formed by two resistances R25 and R26, a slightly higher voltage value is applied to the noninverting input terminal. Therefore, the output voltage of the op amp A24 is "high", transistor T27 is "off" and therefore bridge power transistors T28 and T29 are "off".

The same output voltage of the sensor 14 is applied to the noninverting terminal of the operational amplifier A28. Through the divider formed by resistances R29 and R30 a slightly lower voltage is applied to the inverting input terminal. Therefore the output voltage of the op amp A28 is "high", transistor T31 is "off" and bridge power transistors T32 and T33 are "off" too. In conclusion, when the disc 12 is in the zero position, all bridge power transistors are off and, therefore, because the torque motor 8 is disconnected from power supply, no resistance torque is provided.

Slight rotations of the input shaft in either direction will produce the same rotations of the obtruding disc 12 followed by variations of the illuminated active area of the sensor 14 and by corresponding variations of the sensor 14 output voltages. If the disc is rotated in the clockwise CW direction (with respect to FIG. 6a) the sensor 14 illuminated active area will increase, the positive output voltage of sensor 14 applied to op amp A24 and A28 will increase accordingly, op amp A28 will stay high but op amp A24 will turn "low" and therefore transistors T27 T28 and T29 will turn "on" and will connect the motor 8 to the power supply. Sensor 14 therefore is indicative of the direction of angular deviation. The current supplied to the motor and controlled by the current regulator CR34 produces a torque in CCW (counter clockwise) direction and therefore the motor will try to bring the disc 12 back to the initial zero position. The motor opposing torque is proportional to the current supplied by current regulator CR 34 connected as a constant current source.

Two values of constant current and therefore two values for motor opposing torque on either direction corresponding to two angle modes of operation are determined by the status of the transistor T38 controlled by the outputs of the sensors 16 and 18. When outputs sensors 16 and 18 are high, the transistor T38 is "on", and the resistances R35, R36 and R37 establish the first level of the current delivered by the regulator CR34 corresponding to the torque $T_1$.

When output of sensors 16 or 18 or both outputs are "low" the transistor T38 is cut off and a second level for the current delivered by the regulator CR34 corresponding to the torque $T_2$ is established by the resistances R35 and R36, the resistance R37 being disconnected from the ground. By operating the switch SW 39, two modes, $a_1$–$a_3$ mode (hereinafter $a_1$, $a_2$, $a_3$ and $a_4$ correspond to the Greek letter alpha in the drawings), when SW 39 is connected to the terminal 40, and $a_2$–$a_4$. when SW 39 is connected to terminal 41, are provided. In $a_1$–$a_3$ angular mode, the first torque level is maintained at the $T_1$ value between zero angle and $a_1$ for CW rotation of the disc 12 and at the $T_1$ value between zero angle and $a_3$ for CCW rotation of the disc 12 because the sensor 18 is permanently illuminated and therefore the transistor 38 is "on"; for disc rotations higher than $a_1$ in CW direction and higher than $a_3$ in CCW direction, the output voltage of the sensor 18 turns low because the sensor 18 enters in a dark zone, i.e., disc 12 interrupts the optical path between LED 17 and sensor 18. By turning sensor 18 "low" the transistor T38 is cut off and the second current level is delivered by the current regulator CR34. Therefore in $a_1$–$a_3$ mode for a disc angle rotation higher than $a_1$ in CW direction and higher than $a_3$ in CCW direction, the opposing torque of the motor will increase at the $T_2$ value for either CW or CCW input shaft rotation. The value of angles $a_1$ and $a_3$ can be adjusted by moving plates 42 and 43 over the slots in disc 12.

In $a_2$–$a_4$ mode the sensor 18 output is connected to the ground terminal 41 by the switch 39 and therefore the torque level angles are controlled by the sensor 16. The first torque level is maintained now at the $T_1$ value between zero angle and $a_2$ for CW rotation of the disc 12 and at the same $T_1$ value between zero angle and $a_4$ for CCW rotation of the disc 12 because within these angles the sensor 16 is illuminated; for disc 12 rotations greater than $a_2$ in CW direction and greater than $a_4$ in CCW direction, the sensor 16 enters in dark zones and therefore its output is turned "low", transistor T38 is cut off and the second current level is delivered by the regulator CR34 to the torque motor 8. Therefore in $a_2$–$a_4$ mode, for a disc 12 angle rotation higher than $a_2$ in CW direction and higher than $a_4$ in CCW direction, the opposing torque of the motor will increase at the $T_2$ value for either CW or CCW input shaft rotation. The value of angles $a_2$ and $a_4$ can be adjusted by moving the plates 44 and 45.

Figure 7:
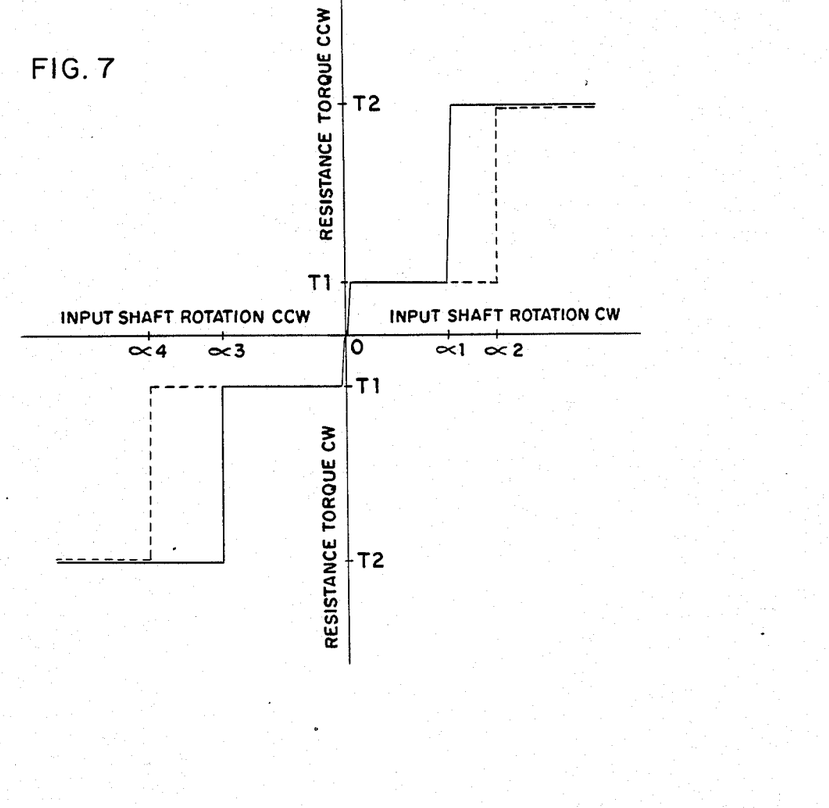
FIG. 7 shows the relationship between the resistance torque and the shaft rotation.

FIG. 7 shows graphically the relationship between resistance torque versus input shaft rotation. In one working embodiment, the torque on the input shaft is constant within an angular rotation of 17 to 125 degrees. The restoring torque within that range is 125 pound inches.

Figure 8:
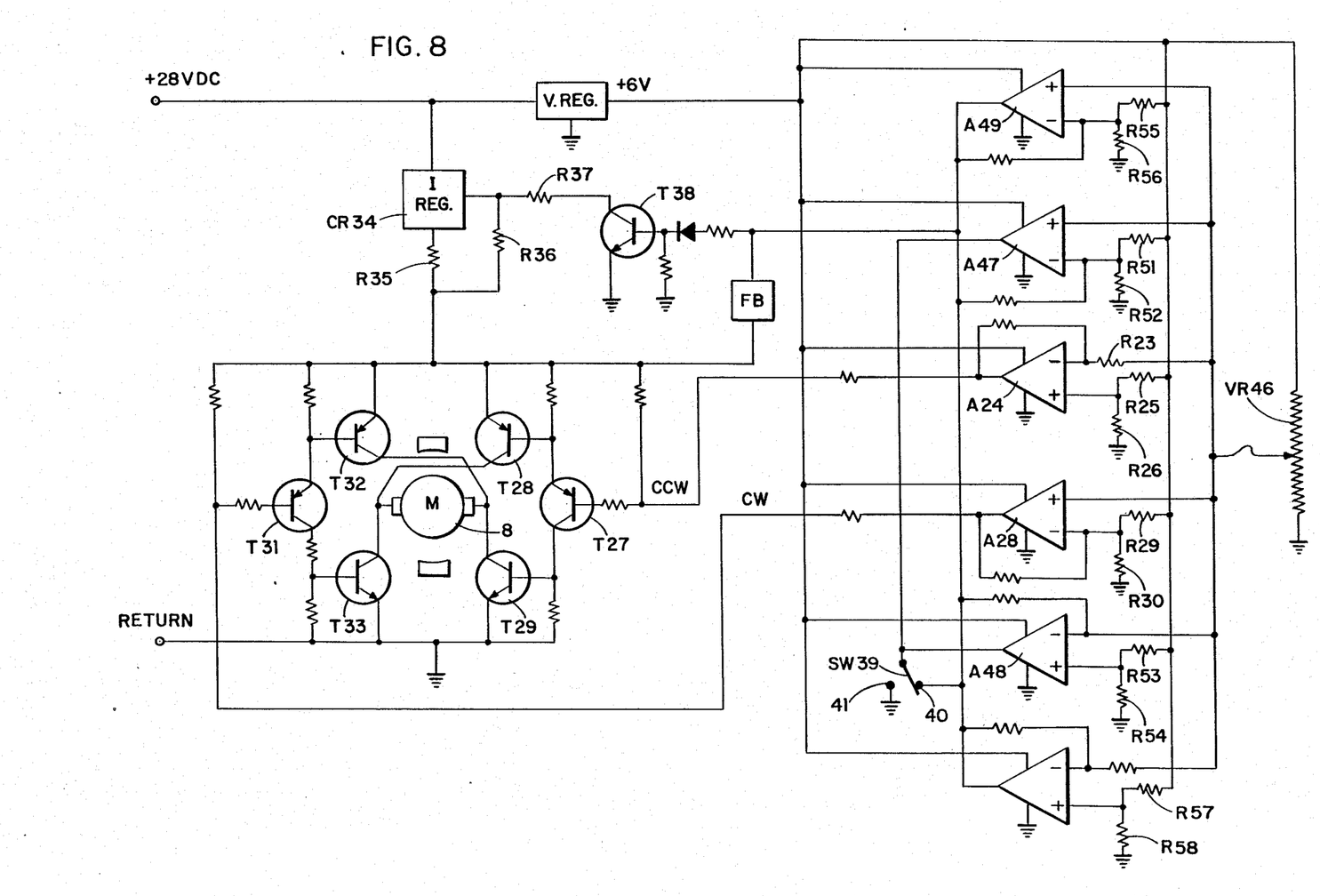
FIG. 8 is the schematic circuit of the mechanism which utilizes a potentiometer as the position sensor.

FIG. 8 represents an embodiment of the present invention in which the positioning disc 12 and opto couplers 13–14, 15–16 and 17–18 are replaced by a positioning potentiometer VR 46 and a pair of op amps for each angle mode, op amps A47, A48, for $a_1$–$a_3$ mode and op amps A49, A50, for $a_2$–$a_4$ mode. The positioning potentiometer is mechanically coupled to the clutch armature 4 as described above with respect to obtruding disc 12.

The value of angles $a_1$ and $a_3$ can be adjusted by adjusting resistance dividers R51-R52 and R53-R54. The value of angles $a_2$ and $a_4$ can be adjusted by adjusting resistance dividers R55-R56 and R57-R58.

Figure 9:
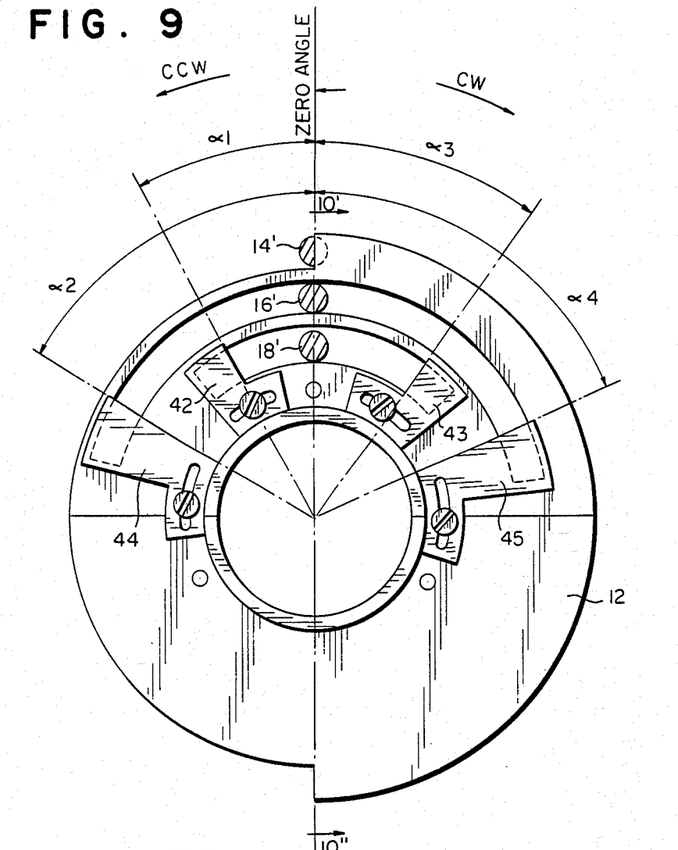
FIG. 9 shows the positioning disc with a different type of position detector.
Figure 10:
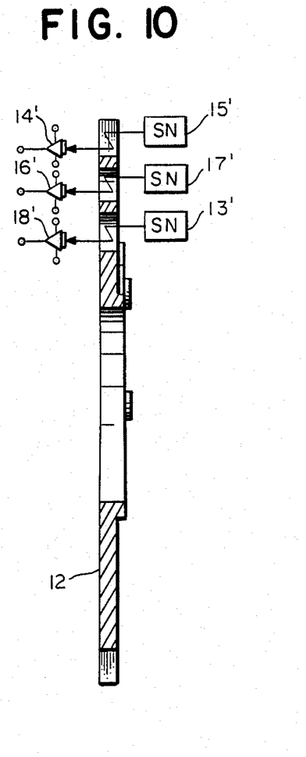
FIG. 10 shows a cross-sectional view of disc 12 from the perspective of section lines 10'-10'' in FIG. 9 and specifically shows Hall effect detectors.
Figure 11:
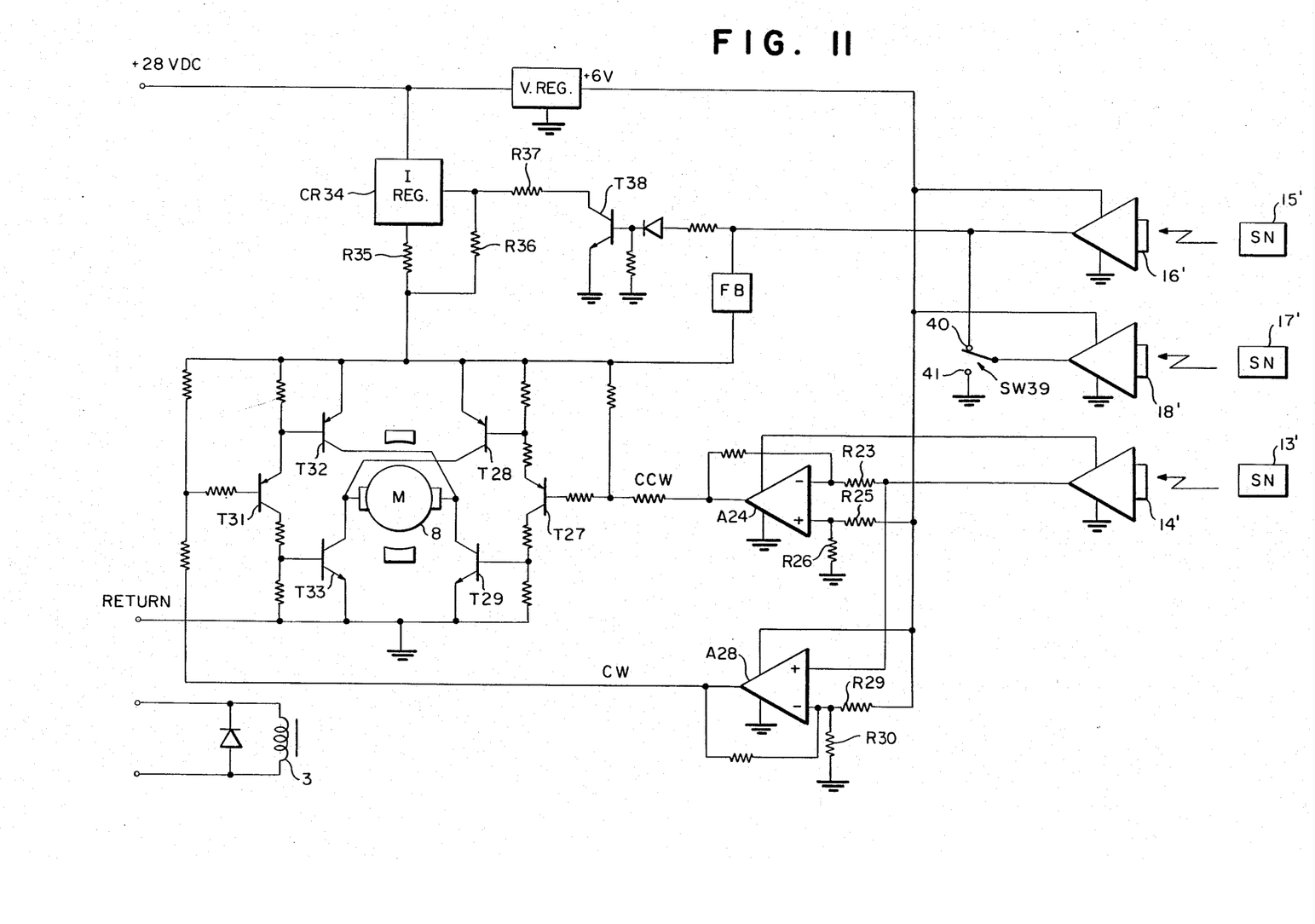
FIG. 11 illustrates the electrical schematic of the system using Hall effect detectors.

FIGS. 9, 10 and 11 represent an embodiment of the present invention in which opto couplers 13–14, 15–16 and 17–18 are replaced by linear Hall effect position transducers 13'–14', 15'–16' and 17'–18'. In this embodiment, the obtruding disc is made of a ferromagnetic material such as soft iron and obtrudes or blocks magnetic lines of flux instead of light rays. The Hall effect devices detect the strength of the field that changes based on the presence or absence of ferromagnetic material. As a result, the same voltage variations, as described in the first embodiment, are obtained at the output of the sensors 14', 16' and 18'. Therefore, the rest of the electrical schematic shown in FIG. 1 remains unchanged and the mode of operation is basically the same as in the embodiment using opto couplers previously described with respect to FIGS. 5, 6a and 6b.

Figure 12:
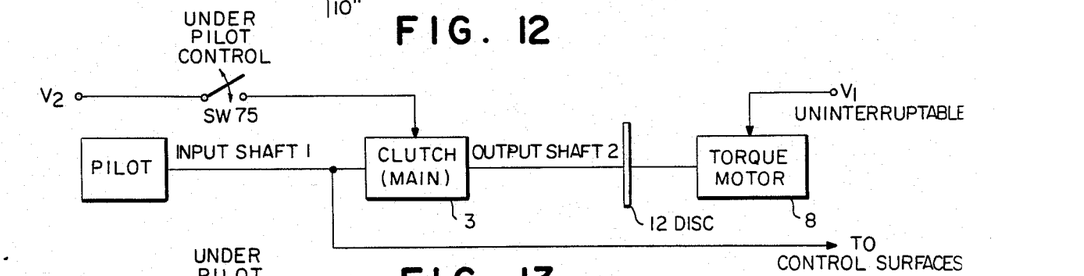
FIG. 12 is a control system schematic showing the disc affixed to the output shaft.

FIG. 12 generally shows the control system schematic for the first embodiment. The pilot of the aircraft directly affects the rotational or angular position of input shaft 1 and thus positions the control surfaces on the aircraft. To engage the autopilot, the pilot must, among other things, engage switch SW75 which activates clutch 3 and couples input shaft 1 to output shaft 2. At that instant, disc 12 has an arbitrarily assigned null position with respect to the angular position of the input shaft at the time the clutch engages the input and the output shaft. If the input shaft rotates and if the angular deviation of that rotation exceeds a first predetermined degree of deviation, torque motor 8 is activated which applies a scheduled amount of opposing torque to output shaft 2 and hence to the coupled input shaft 1. The power supply to torque motor 8 $V_1$ is uninterruptible and is not under the pilot's control as is the power supply $V_2$ applied to clutch 3.

If the pilot then disengages clutch 3 by opening switch SW75, there is a requirement that torque motor 8 must return position disc 12 to the null position within a very short period of time, typically one second. This requirement means that the voltage source $V_1$ to torque motor 8 be uninterruptible and not under the pilot's control. The pilot then reengages clutch 3; a different null position is set with respect to the input shaft 1 but disc 12 must be at the initially set authority limiter's null position wherein position detector 14 is partially blocked by the outer cut-out of the disc. See, for example, FIG. 6a.

The requirement that torque motor 8 return disc 12 to the null position within a short period of time requires that the torque motor be very large and the motor and associated electronics operate very quickly, i.e., have a fast response time.

Figure 13:
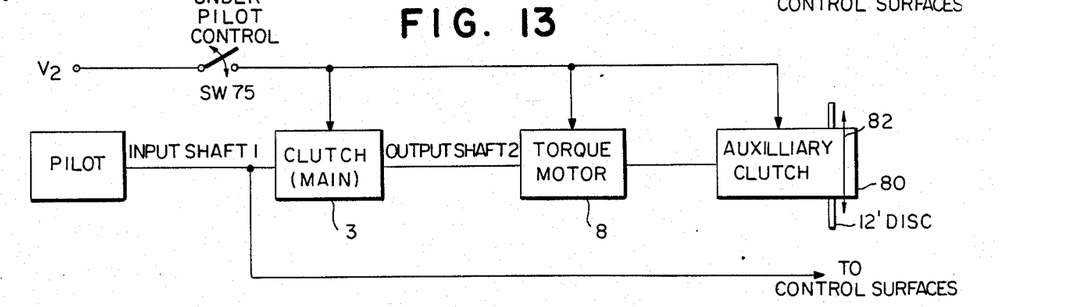
FIG. 13 is another control system schematic showing another embodiment of the present invention wherein the disc is clutched to the output shaft.

A secure, uninterruptible power supply to the torque motor may not be available or preferable in a particular application. Therefore, FIG. 13 illustrates another embodiment of the present invention wherein positioning disc 12 is coupled to output shaft 2 via an auxiliary clutch 80. In this embodiment, voltage $V_2$ which is under the pilot's control by way of switch SW75 supplies power to the main clutch 3, torque motor 8 and auxiliary clutch 80. Therefore, when switch SW75 is closed, main clutch 3 couples input shaft 1 to input shaft 2, applies power to torque motor 8 and further couples disc 12 to output shaft 2 by way of auxiliary clutch 80. Associated with disc 12 is a null biasing or centering means which is illustrated in FIG. 13 as the double headed arrow 82.

In the first embodiment of the invention (FIG. 12), the moment clutch 3 is disengaged the motor gear output shaft 2 returns automatically to its initial position. In order to accomplish this, clutch 3 of the authority limiter and motor 8 must have separate power supplies ($V_2$ and $V_1$) for motor 8 must remain connected to the output of the bridge T28, T29, T32 and T33 (FIG. 5) when the coil of clutch 3 is deenergized. If there is a limited time within which the initial null position must be achieved, the motor and amplifier must be vested with sufficient power to return to the initial position in the available time.

The second embodiment (FIG. 13) makes obtruding disc 12 separately engageable to output shaft 2 by means of an auxiliary clutch 80. Then, when power to the entire system is interrupted, disc 12 can be disengaged from the mechanism and returned to the defined initial position by a spring centering mechanism 82 but the motor and gearing in the authority limiter can remain in an indeterminate position.

Figure 14:
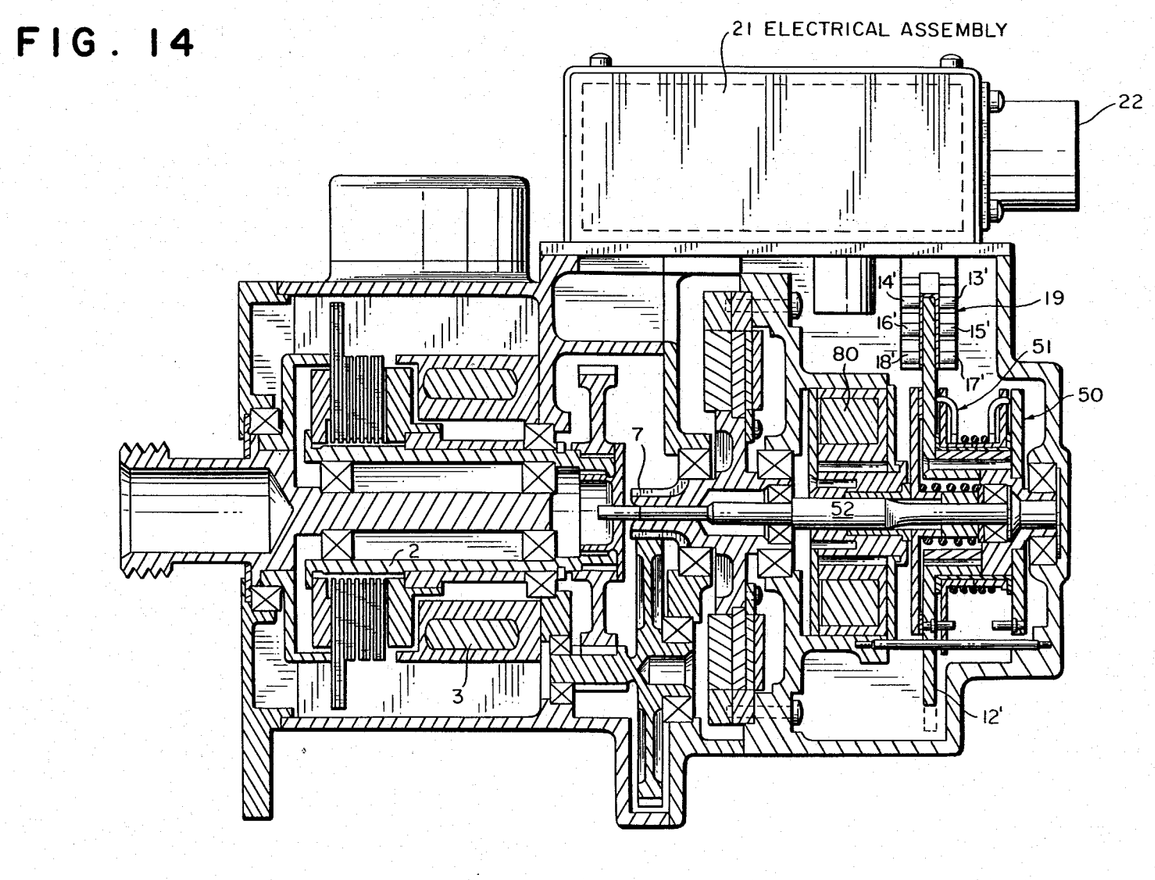
FIG. 14 shows an axial section of another embodiment of the invention with the disc clutched to the output shaft.
Figure 15:
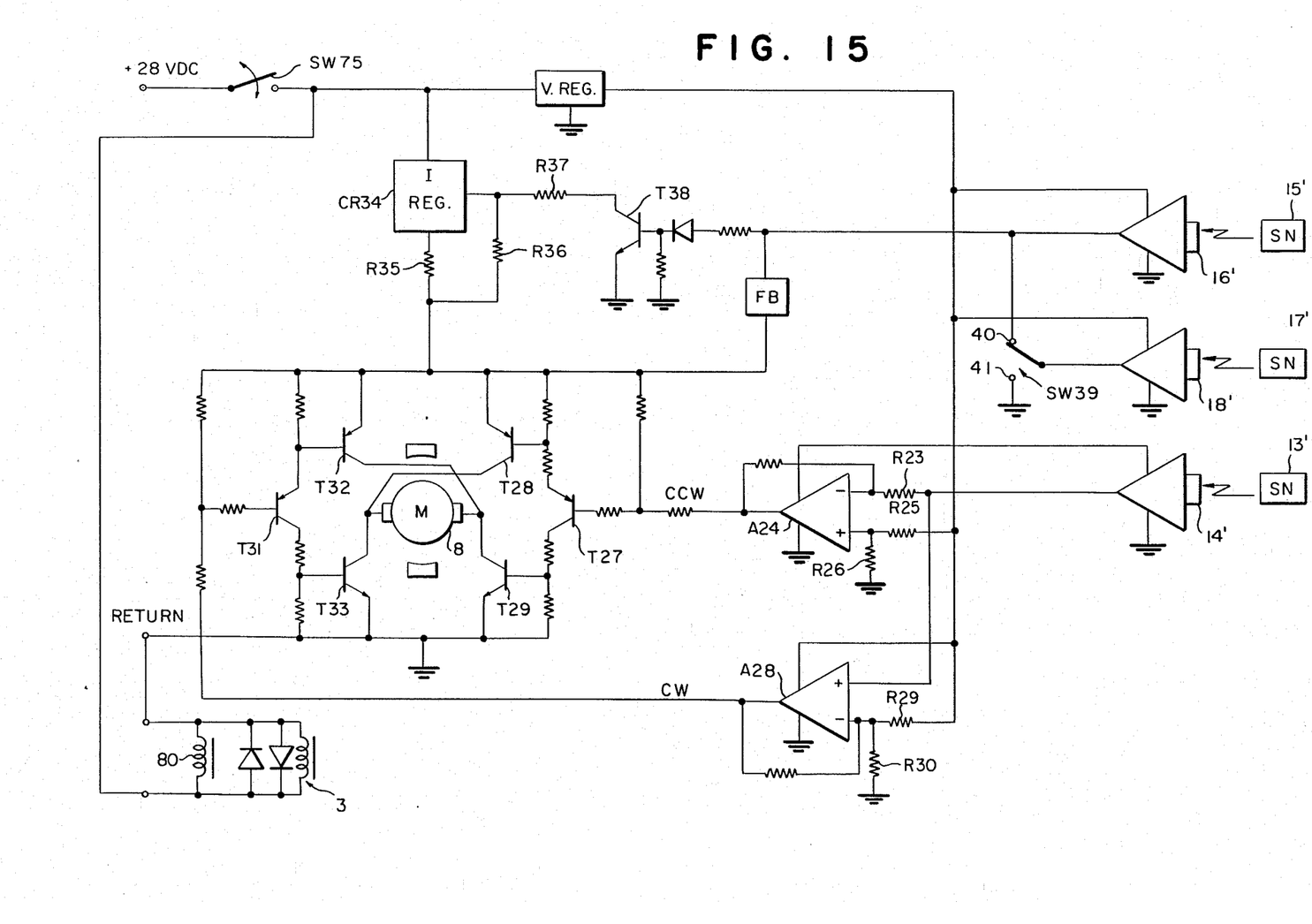
FIG. 15 is the electrical schematic of the embodiment of FIG. 14 using Hall effect devices.
Figure 16:
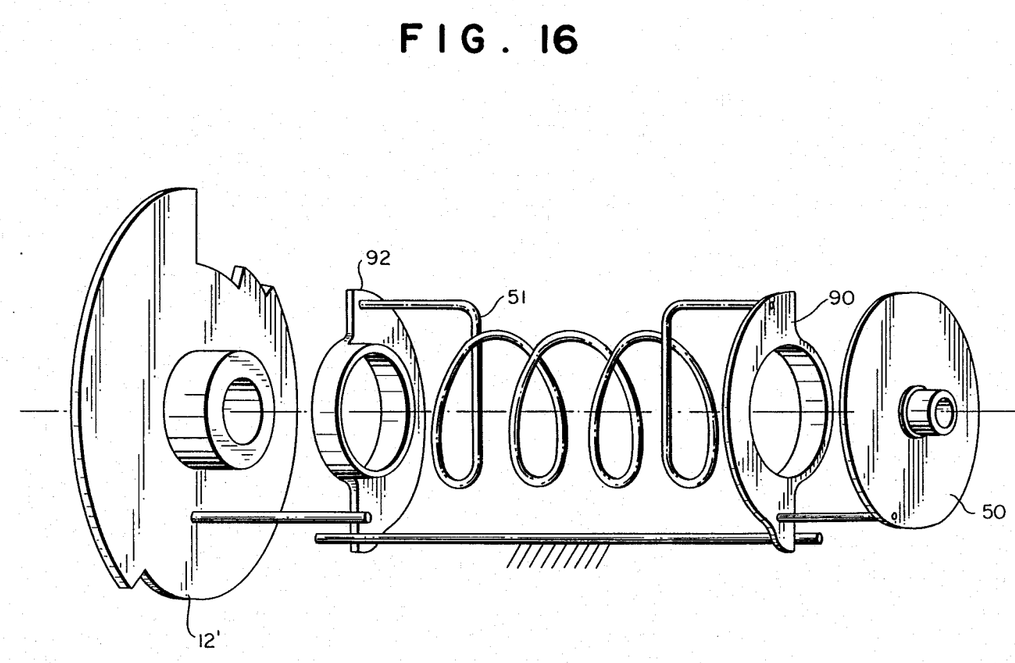
FIG. 16 shows an exploded detail of the centering mechanism.

FIGS. 14, 15 and 16 represent an embodiment of the present invention in which the positioning disc 12' mounted in a centering mechanism (50 and 52 among other items) is attached to output shaft 2 through a supplementary or auxiliary clutch 80. The winding of this clutch is connected in parallel with the winding of the main clutch 3 as shown in the lower left-hand corner of FIG. 15. The centering mechanism is shown in detail in FIG. 16. A disc 50 and obtruding disc 12' are fastened together and rotate as one piece. When clutch 80 is deenergized, obtruding disc 12' is rotated to a zero or null position by a centering spring 51. Centering spring 51 is a rotational centering means. When clutch 80 is energized, the centering mechanism is connected to output shaft 2 by a shaft 52 (FIG. 14) which passes through motor shaft 7 of torque motor 8. The motor is coupled to the output shaft by a two-stage gear system. As output shaft 2 is rotated in either direction, the obtruding disc is rotated in the same direction and a torsional deflection is created in the centering spring 51. As seen in FIG. 16, one type of rotational motion (i.e., CW) moves the right-hand spring plate 90; the other rotational motion moves plate 92. The potential energy, accumulated in the centering spring, drives the obtruding disc to a zero or null position when the DC power is removed.

As can be appreciated, the null position is defined as a certain angular position with respect to the authority limiter and particularly with respect to the support 19 for Hall effect detector sets 13'–14', 17'–18' and 15'14 16'. In a sense, the null position is established for the authority limiter in its deactivated or deenergized state and the null position for the input shaft is established when clutches 3 and 80 are engaged by closure of switch SW75.

This second embodiment of the invention fulfills the requirement that the authority limiter be disengageable regardless of the position of the input shaft with respect to the initially engaged null position. This also allows the authority limiter to seek the original null point with respect to itself within a very short time, approximately one second preparatory to the next engagement of the input and output shafts. When the power is withdrawn from the clutches and the torque motor, the authority limiter is free to drift under vibratory or similar random excitation forces. When power is restored, both clutches engage at once thereby creating the necessary conditions to establish a desired restoring force or torque from the second engagement point that is defined as the new null position with respect to the angular position of the input shaft.

This embodiment permits the electronic system to be shutdown between use periods rather than to require an uninterruptible power supply to the motor. Further, the motor and response time of the associated drive electronics need not be designed to have a response time to return the system to the null position within the prescribed one-second period.

Although the clutch shown in the illustrations is a serrated jaw type, a multiple disc type clutch can be used with the present invention.

Figure 1:
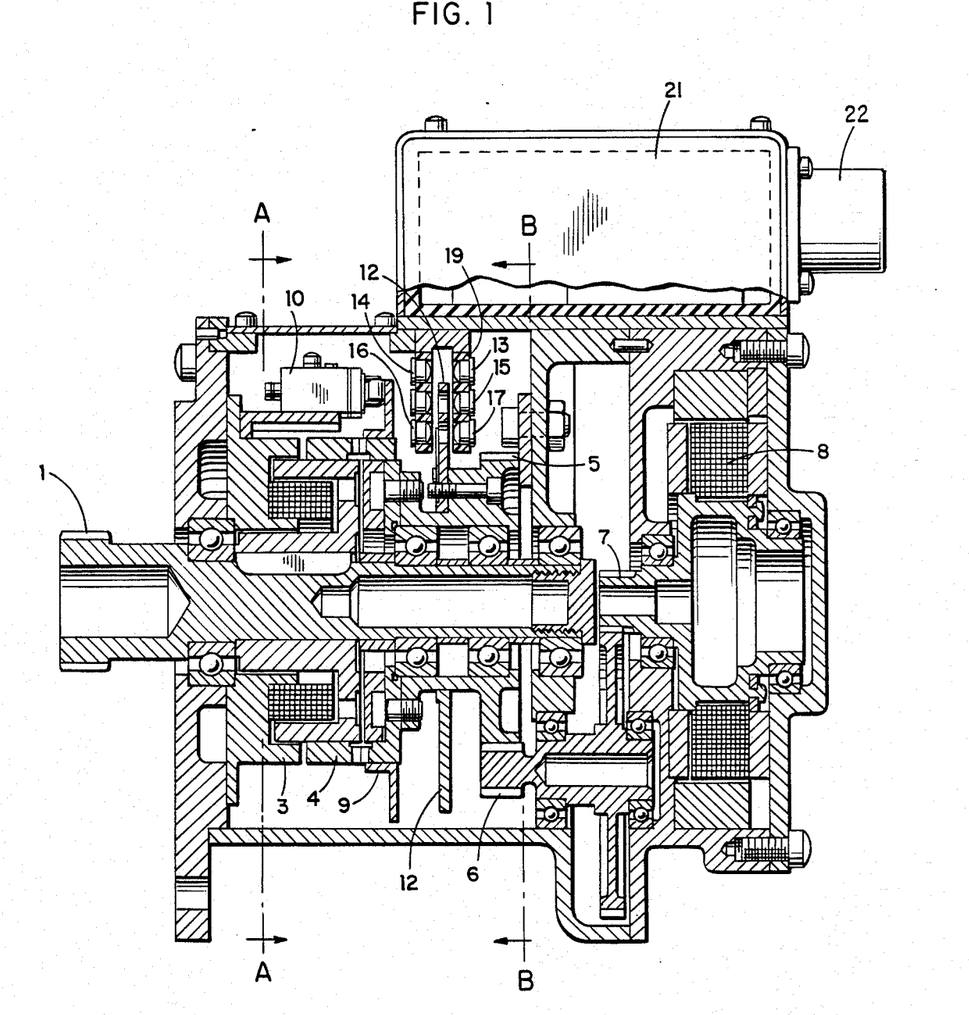
FIG. 1 is an axial section of an embodiment of the present invention, illustrating an electrical clutched opposing torque mechanism.
Figure 2:
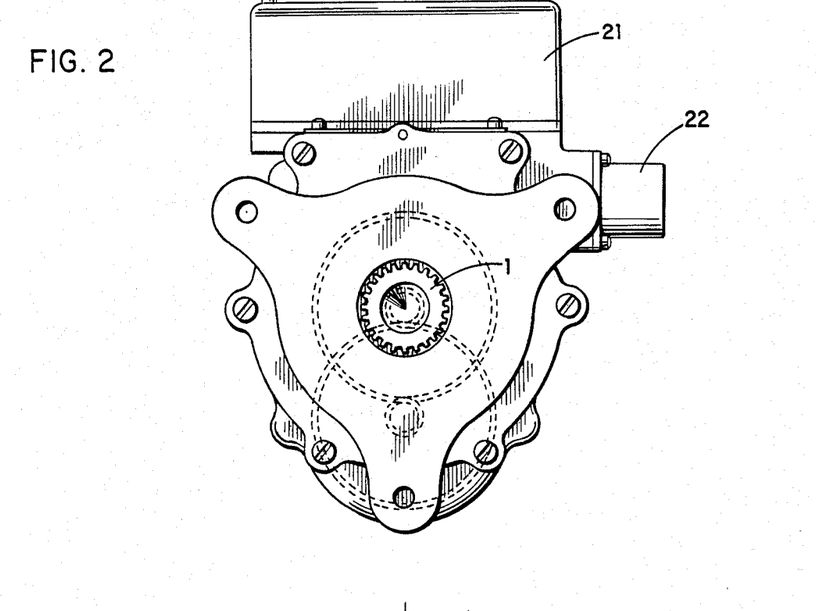
FIG. 2 is a front view of the mechanism shown in FIG. 1.
Figure 17:
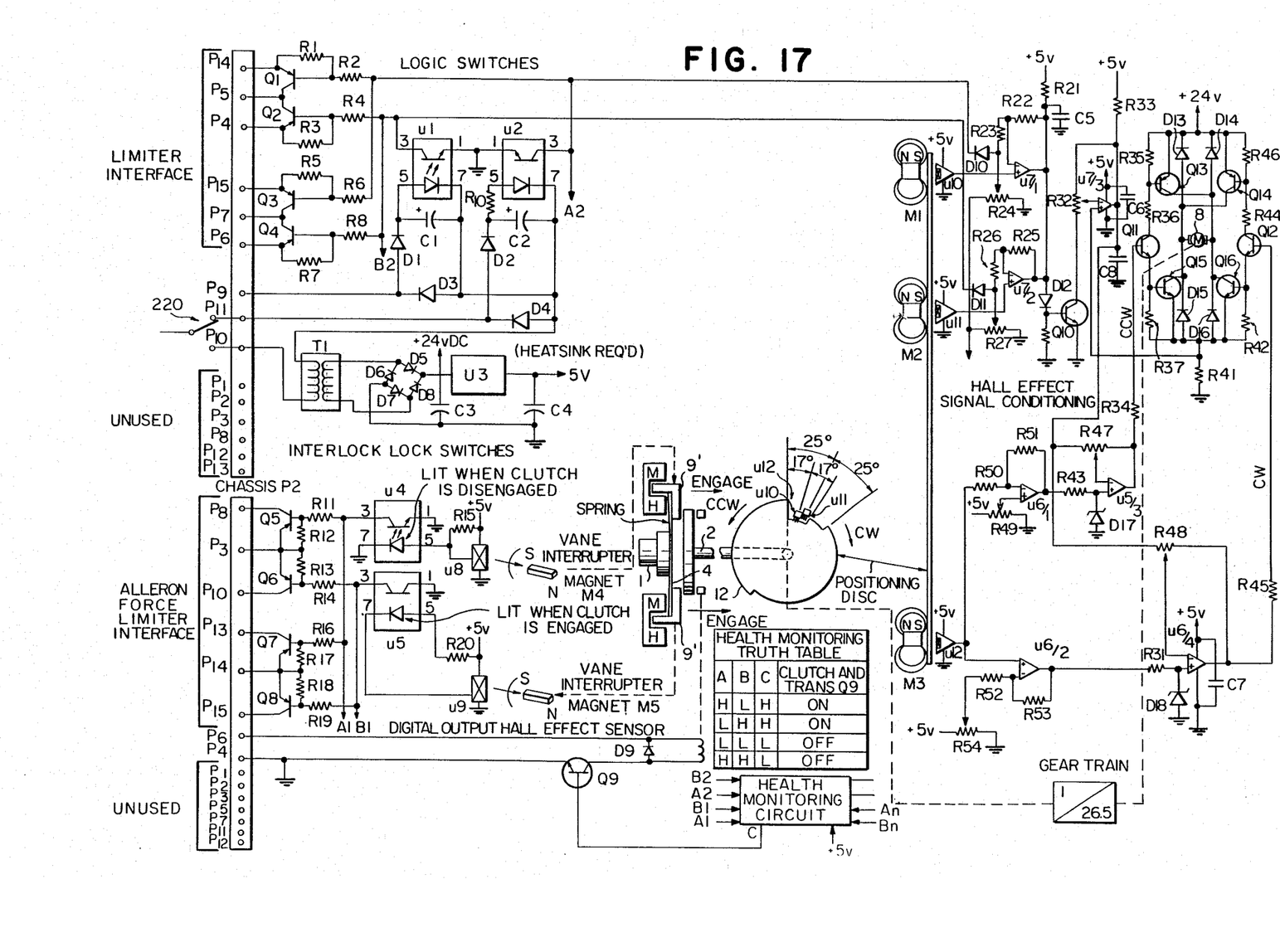
FIG. 17 shows the electrical schematic of the embodiment of FIG. 1 in which the electromechanical logic switches, and interlock switches have been replaced by solid state switches using Hall effect devices, opto couplers and transistors. This figure also shows other features which will be detailed in the description of this embodiment.

FIG. 17 represents another embodiment of the present invention. In this embodiment, for which the mechanical system is illustrated in FIG. 1, the shaft 1, which is normally free to rotate in either direction, becomes coupled to the motor gear output shaft 2 at the instant the power is applied to the terminals of clutch 3, i.e., when the autopilot is activated, and if the transistor Q9 is turned on by the Health Monitoring Circuit as will be described further hereinafter. Attached to the shaft 2 (FIG. 1) is the position disc 12 and the spur gear 5. This spur gear 5, together with spur gear 6 and pinion 7 form a two stage gear coupled to the torque motor 8. Attached to the clutch armature 4 is a ferro-magnetic vane interrupter 9, which activates Hall effect switches U8 and U9 (FIG. 17). When the clutch is in the engaged position, the vane interrupter is absent between the magnets M4 and M5 and Hall effect sensors U8, U9. In this position the opto coupler U5 is activated and turns "on" the transistors Q6 and Q8, and opto coupler U4 is not activated and therefore transistors Q5, Q7 are turned "off". As a result, the circuits between pins P8, P9 connected to Q5 and pins P13, P14 connected to Q7 are practically interrupted and pins P9, P10 connected to Q6 and pins P14, P15 connected to Q8 are practically short circuited. When the clutch is in the disengaged position the opto coupler U5 is not activated and U4 is activated therefore the circuits between pins P8, P9 and between pins P13, P14 are closed and the circuit between P9, P10 and P14, P15 are opened.

If after the clutch is engaged there is no torque applied to the shaft 1, the position disc 12 is in a zero position as it is shown in FIG. 17. In this position half of the linear Hall effect sensor U12 is activated and therefore the output voltage of this sensor will have an average value (such as 2.500 volts). This voltage is applied to the inverting terminal of an operational amplifier U6/1. Through the divider formed by the potentiometer R49, a slightly lower voltage value (such as 2.400 volts) is applied to the noninverting input terminal. Therefore the output voltage of the op amp U6/1 is low, the output of the op amp U6/3 is also low, the transistor Q11 is off and power transistors Q13, Q15 are off. The same voltage from zero position Hall effect sensor U12 (2.500 volts) is applied to the noninverting terminal of the op amp U6/2. Through the divider formed by the potentiometer R54, a slightly higher voltage (for example 2.600 volts) is applied to the inverting input terminal. Therefore the output of U6/2 is low, the output of op amp U6/4 is also low, the transistor Q12 is off and power transistors Q13, Q15 are off. In conclusion when the disc 12 is in zero position, all bridge power transistors are off and, therefore, because the motor 8 is disconnected from the 24V power supply, no resistance torque is provided.

Slight rotations of the input shaft 1 in either direction will produce corresponding rotations of the position disc 12 followed by variations of the zero position Hall effect sensor U12 output voltages. If the disc is rotated in the clockwise CW direction (with respect to FIG. 17) the sensor U12 output voltage will decrease, (to 2.300 volts, for example) the position voltage applied to op amps U6/1 and U6/2 will decrease accordingly, op amp U6/2 will stay "low" but op amp U6/1 will turn "high", a reference voltage (for example, 1.500 volts) determined by zener diode D17 is applied to the noninverting input of op amp U6/3 which turns "high" and therefore the transistors Q11, Q13 and Q15 are turned "on" and the motor 8 is connected to the 24V power supply, developing a torque in counter clockwise CCW direction and therefore the motor will try to bring the disc 12 back to the initial zero position. The motor opposing torque is proportional to the current regulated by the feedback voltage of resistor R41 applied through the op amp U7/3 to the inverting terminal of the op amp U6/3 where it is compared to the zener diode D17 reference voltages. In this way the power bridge becomes a linear controlled current regulator by controlling transistors Q11, Q13 and Q15. If, from its zero position, the disc 12 is slightly rotated in a counterclockwise direction, CCW, the sensor U12 output voltage will increase (to 2.700 volts, for example), the positive voltage applied to op amps U6/1 and U6/2 will increase accordingly, op amp U6/1 will stay "low" but now op amp U6/2 will turn "high", a reference voltage (1.500 volts, for example) determined by zener diode D18 is applied to the noninverting terminal of op amp U6/4 which turns "high" and therefore transistors Q12, Q14 and Q16 are turned "on", connecting the motor 8 to the 24V power supply. Now the motor current flows in an opposite direction than before, developing a torque in the clockwise direction. The motor will therefore try to bring the disc 12 back to the initial zero position. Again the motor current is regulated by the feedback voltage from resistor R41 applied through the op amp U7/3 to the inverting terminal of the op amp U6/4 where it is compared to the zener diode D18 reference voltage. In this way the power bridge current is linearly controlled by controlling transistors Q12, Q14 and Q16.

Two values of constant current and therefore two values for motor opposing torque in either direction corresponding to two angle modes of operation are determined by the status of the transistor Q10 (FIG. 17) controlled by the Hall effect sensors U10 and U11. Whereas these angular modes can be any two (or more) angular modes, the description following will refer to them as ±17° and ±25° modes. It should be appreciated that this is merely a convenient reference to "first mode" and "second mode". For the zero position and for any position between ±17° for the Hall effect sensor U10 and between ±25° for the Hall effect sensor U11, the output voltages of these sensors are high (for example, 2.700 volts). Applied respectively to the noninverting terminals of op amps U7/1 and U7/2, these op amps are turned high because the reference voltages are set at a lower value (for example, 2.500 volts) respectively by the potentiometers R24 and R27. When both op amps U7/1 and U7/2 are "high" the transistor Q10 is turned "on" and the gain of the op amp U7/3 is set to the value required by the first level of the constant current corresponding to the torque T1 of FIG. 7. When any of the op amps U7/1 or U7/2 turn "low" the transistor Q10 is cut off and the gain of the op amp U7/3 is decreased therefore establishing the second level of the constant current corresponding to the torque T2 of FIG. 7. The second level occurs when the disc 12 travels ±17° or more At the edge of ±17° the output voltage of the sensor U10 drops (to 2.300 volts, for example) and therefore op amp U7/1 is turned "low" because the reference voltage is higher (2.500 volts) than 2.300 volts. When the disc 12 travels ±25° or more, at the threshold of ±25° travel, the output voltage of the sensor U11 drops (say to 2.300 volts, for example) and therefore op amp U7/2 is turned low as well because the reference voltage is now higher (2.500 volts) than 2.300 volts.

The 17° mode or 25° mode may be selected by switching a pilot mode switch 220. When the mode switch is in the 17° mode (FIG. 17), the voltage across the zener diode D3 lights the opto coupler U1 and therefore the cathode of diode D11 is grounded. In the situation the reference voltage op amp U7/2, equal to the forward drop voltage of the diode D11 (1 volt, for example), will be at all times smaller than the smallest output voltage of the 25° mode Hall effect sensor (2.300 volts, for example) and therefore op amp U7/2 will always be high for any position of disc 12, the only "operational" sensor being now the 17° mode Hall effect sensor. The same opto coupler U1 is used to activate the Solid State Logic switches by turning "on" the transistors Q2, Q4. Therefore when the 17° mode is selected there is a circuit closure between pins P6 and P7 and between pins P4 and P5.

When mode switch is in the 25° mode the voltage across the zener diode D4 lights the opto coupler U2. Now the cathode of diode D10 is grounded and the reference voltage of op amp U7/1, equal to the forward drop voltage of the diode D10 (for example, 1 volt) will be always smaller than the smallest output voltage of the 17° mode Hall effect sensor (for example, 2.300 volts). Therefore op amp U7/1 will always be "high" for any position of the disc 12. The only "operational" sensor in the 25° mode is therefore the 25° mode Hall effect sensor. The same opto coupler U2 is used to activate the Solid State Logic Switches by turning "on" the transistors Q1 and Q3. Therefore when the 25° mode is selected there is a circuit closure between pins P15 and P7 and between pins P14 and P5

A "Health Monitoring" or fault monitoring circuit has been provided as shown on FIG. 17. The block marked Health Monitoring CKT is an Exclusive—OR logic device. Inputs are made in pairs: A1 and B1, A2 and B2 ... An and Bn. The logic device is operated to produce a "high" output at pin C if all the input pairs have either A or B high while the other member of the pair is low. If any pair, say An and Bn, are both high or both low, the logic device will produce a "low" output at C regardless of the condition of the remaining inputs.

Considering pair A1 and B1 at the lower left of FIG. 17, when the clutch is engaged, opto coupler U5 will be lit and the current drain from pin P9 of the connector through resistor R13 and R14, and from pin P14 of the connector through resistors R18 and R19, will produce a "low" condition at B1, and will turn transistors Q6 and Q8 on. These transistors enable their connected load to pass through pins P10 and P15 of the connector respectively.

Opto coupler U4 will be off when the clutch is engaged. Since there is no current draw through resistors pairs R12 and R11 or R17 and R16, there will be a "high" condition at A1 and transistors Q5 and Q7 will be off.

When the clutch is disengaged, opto coupler U5 will be off and opto coupler U4 will be lit. As should be apparent from FIG. 17, transistors Q6 and Q8 will be off, while transistors Q5 and Q7 will be on.

The opto couplers U4 and U5 thus form switches to alternatively enable and disable the airplane equipment associated with the switches.

A fault condition would exist if A1 and B1 were both low or if they were both high, since the clutch cannot be both engaged and disengaged at the same time. The Exclusive—OR logic circuits would provide low output to point C, and this would cause transistor Q9 to turn off, thus interrupting current to the clutch coil.

As shown in FIG. 17, the fault monitoring logic is not restricted to only one input pair. Pair A2 and B2 is shown at the upper left monitoring opto couplers U1 and U2 which are lit when the command mode is for 17° or 25° respectively. The opto couplers U1 and U2 form switches to signal the fault monitoring circuit, via inputs A2 and B2, that the predetermined angle mode activated agrees with the predetermined angle mode selected.

These opto couplers not only disable U7/2 and U7/1 respectively to enable the 17° and 25° modes but, by circuit action essentially identical to that described above for opto couplers U4 and U5 they enable transistors Q2 and Q4 when the 17° mode has been selected, leaving point B2 low, or they enable transistors Q1 and Q3 when the 25° mode has been selected, leaving point A2 low.

Points A2 and B2 are connected to the Exclusive—OR logic circuit, the output of which will be high if A2 and B2 as well as all the other input pairs satisfying the input condition.

Transistors Q2 and Q4 signal back to the aircraft that 17° mode has been selected and confirmed. Transistors Q1 and Q3 signal that the 25° mode has been selected and confirmed.

In addition to the two cases delineated above, the fault monitoring system may similarly examine a large number of circuit point pairs, the correct operation of which is deemed important to the "health" or normal operation of the system. When a circuit being monitored is a singular channel which cannot provide the "paired" information required, an identical or similar circuit can be added to provide the witness information.

It is to be understood that the invention is not limited to the specific embodiments described in detail herein and modifications and variations are covered by the spirit and scope of the appended claims.

What we claim is:

1. In combination with an autopilot transfer device, an authority limiter comprising:
   a. an input shaft which is normally free to rotate in either direction;
   b. a motor gear output shaft;
   c. an electromagnetic clutch used to couple the input shaft to the motor gear output shaft;
   d. a torque motor geared to said output shaft;
   e. an obtruding disc attached to the motor gear output shaft, said obtruding disc having cut-out portions therethrough;
   f. a number of Hall effect sensors activated by magnets and the presence or absence of said cut-out portions of said obtruding disc; and
   g. an electronic circuit means for controllably applying current, dependent upon the output of said Hall effect sensors, to said torque motor to generate an opposing torque on said output shaft.

2. In combination with an autopilot transfer device, an authority limiter comprising:
   an input shaft which is normally free to rotate in either direction;
   a motor gear output shaft;
   an electromagnetic clutch used to couple the input shaft to the motor gear output shaft;
   a torque motor geared to said output shaft;
   an obtruding disc attached to the motor gear output shaft, said obtruding disc having at least three arcuate cut-out portions therethrough respectively indicative of a null angular position of said output shaft and at least two predetermined degrees of permissible angular deviation in either direction from said null position by said output shaft;
   at least three stationary Hall effect sensors activated by the presence or absence of said cut-out portions of said obtruding disc and producing outputs respectively representative of the direction of angular deviation by said output shaft from said null position and of any angular deviation exceeding either of said two predetermined degrees of angular deviation; and
   an electronic circuit means for controllably applying at least two scheduled currents, dependent upon the outputs of said sensors, to said torque motor to generate two corresponding scheduled opposing torques in either opposing direction on said output shaft when the angular deviation thereof exceeds a corresponding predetermined degree of angular deviation.

3. The combination as claimed in claim 2 wherein said authority limiter operates from the null angular position dependent upon the circumferential arcuate spans of said cut-out portions and a plurality of scheduled opposing torque values are applied to said output shaft in accordance with a corresponding plurality of predetermined angle modes defining predetermined degrees of permissible angular deviations and represented by said circumferential spans; said obtruding disc having an etched slot as a first cut-out portion for said null angular position and one slot corresponding to another cut-out portion for every predetermined angle mode- provided by the authority limiter.

4. The combination as claimed in claim 3 wherein switches are provided to signal that the predetermined angle mode activated agrees with the predetermined angle mode selected.

5. The combination as claimed in claim 4 in which the switches are solid state devices.

6. The combination as claimed in claim 2, said sensors being activated by the obtruding disc, one sensor for detecting the null angular position of said obtruding disc and the attached output shaft and coupled to means for activating a motor bridge to connect the torque motor to a power source such that the torque delivered by the motor will oppose the torque of said output shaft any time the obtruding disc is offset from said null angular position, and other sensors for every angle mode defining predetermined degrees of permissible angular deviations by said output shaft provided by the authority limiter, each of said other sensors coupled to further means for controlling the scheduled current supplied to the motor.

7. The combination as claimed in claim 2 wherein switches are provided to enable an associated equipment upon engagement of the clutch, and, conversely, to disable the associated equipment upon disengagement of the clutch.

8. The combination as claimed in claim 7 in which the switches provided to enable the associated equipment are solid state devices.

9. The combination as claimed in claim 2 in which a fault monitoring circuit is provided to enable an the electromagnetic clutch only when inputs representing conditions for normal operation are supplied to said fault monitoring circuit, and to disable the electromagnetic clutch in the event any input representing conditions for normal operation is not supplied.

10. The combination as claimed in claim 9 in which the fault monitoring circuit is a solid state device.

11. In combination with an autopilot transfer device, an authority limiter comprising:
   a. an input shaft which is normally free to rotate in either direction;
   b. a motor gear output shaft;
   c. an electromagnetic clutch used to couple the input shaft to the motor gear output shaft;
   d. a torque motor geared to said output shaft;
   e. an obtruding disc attached to the motor gear output shaft through a supplementary electromagnetic clutch, said obtruding disc having cut-out portions therethrough;
   f. a number of sensors activated by the presence or absence of said cut-out portions of said obtruding disc;
   g. an electronic circuit means for controllably applying current, dependent upon the output of said sensors, to said torque motor to generate an opposing torque on said output shaft; and
   h. a centering means coupled to said obtruding disc for accumulating potential energy when said obtruding disc is driven from a null position in either direction, said centering means driving said obtruding disc to said null position when power is removed from both said clutches.

12. The combination as claimed in claim 11 sensors are opto couplers activated by light emitting diodes.

13. The combination as claimed 11 wherein said sensors are Hall effect detectors associated with magnets and said disc alters the magnetic field between said magnets and said detectors.

* * * * *